C. S. LOCKWOOD.
HELICAL ROLL WINDER.
APPLICATION FILED JAN. 7, 1910.
964,288.
Patented July 12, 1910.
5 SHEETS—SHEET 1.
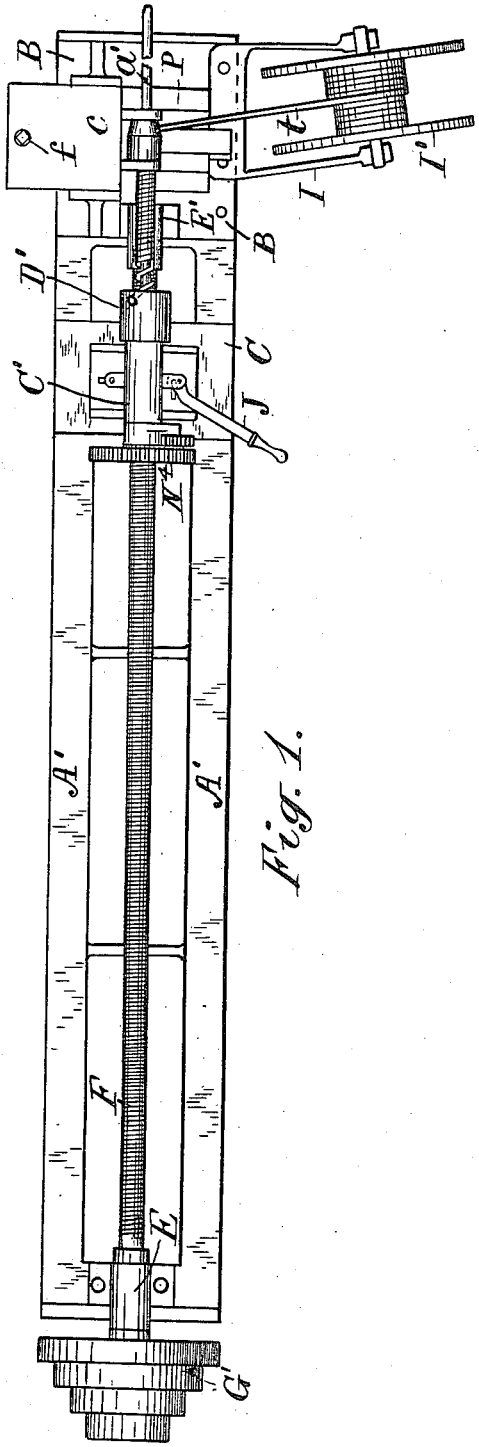
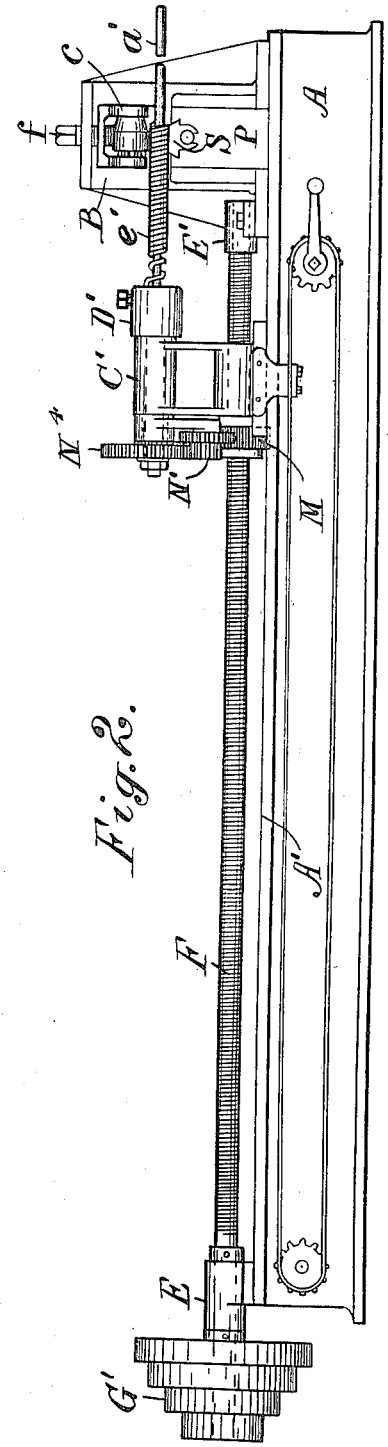
Witnesses:
Inventor
Charles S. Lockwood
Thomas S. Crane, Atty

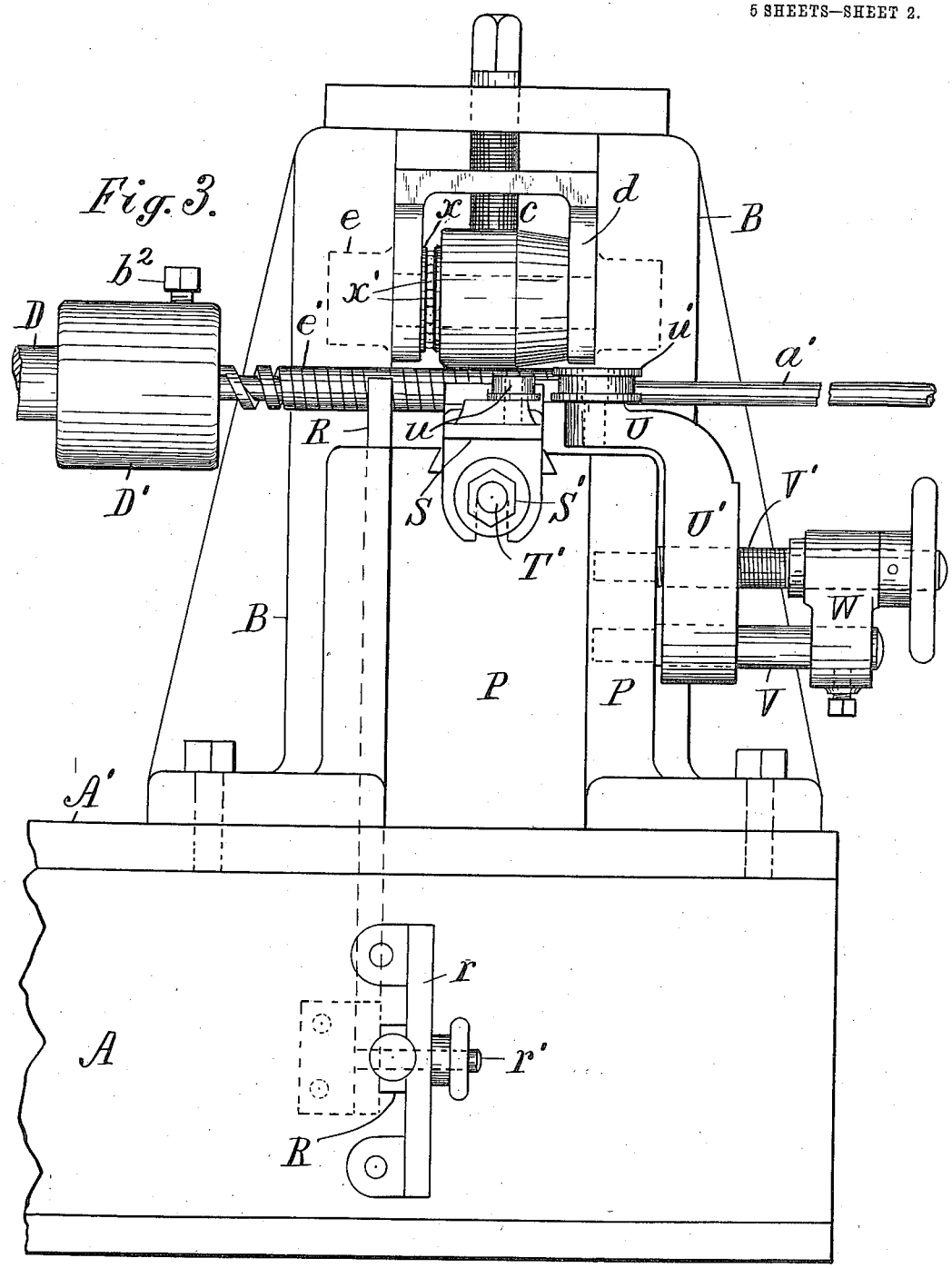

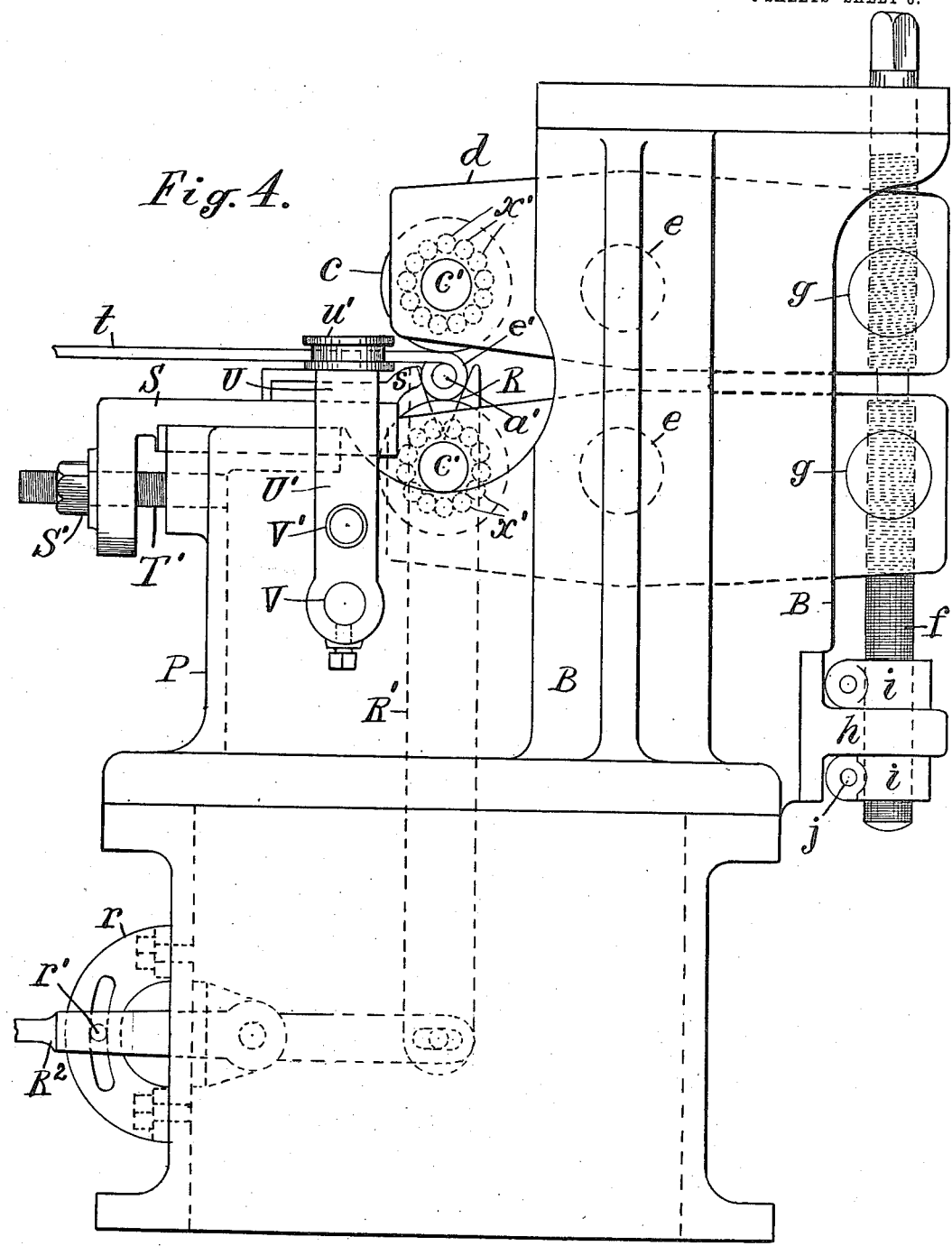

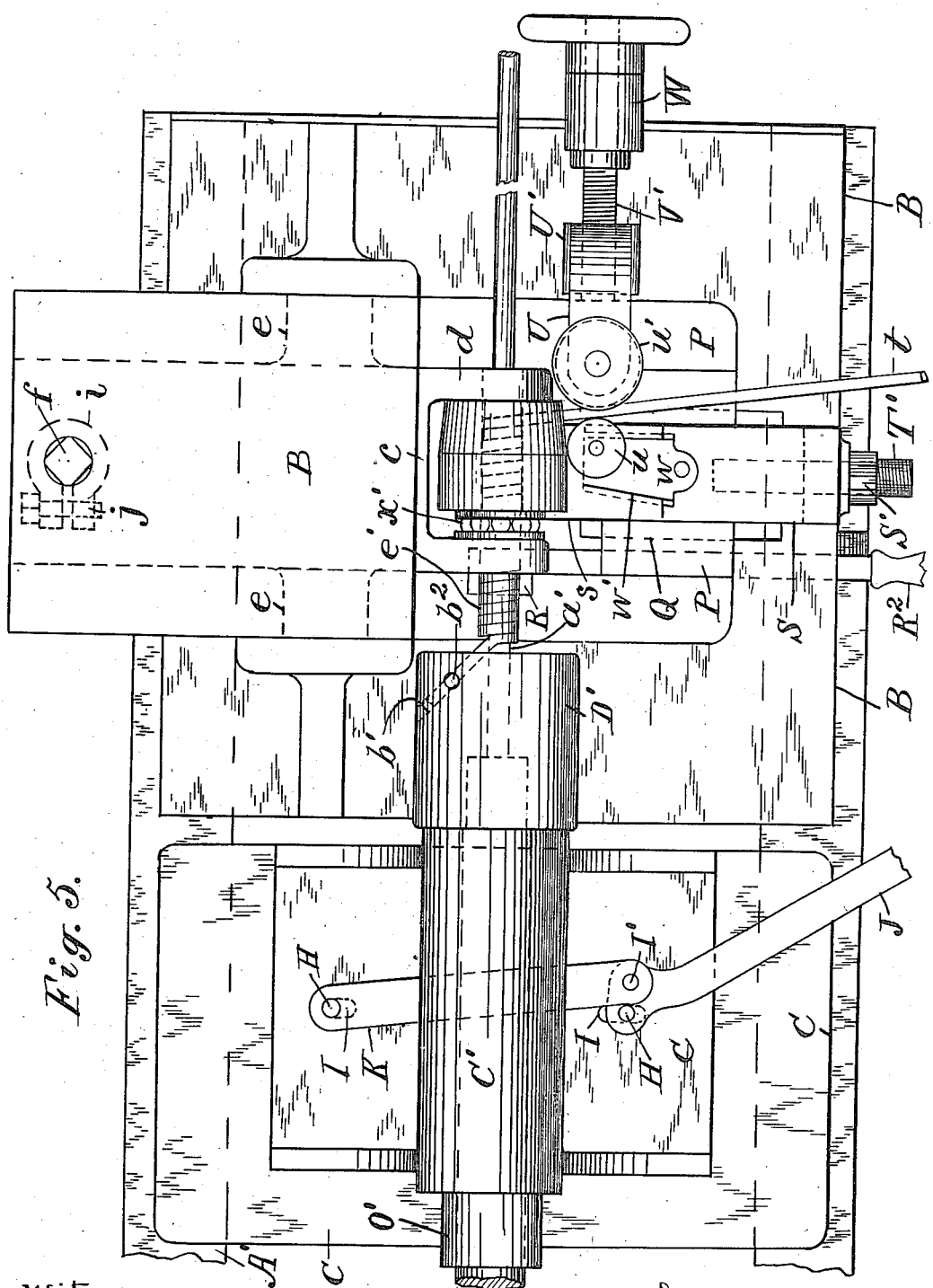

C. S. LOCKWOOD.
HELICAL ROLL WINDER.
APPLICATION FILED JAN. 7, 1910.
964,288.
Patented July 12, 1910.
5 SHEETS—SHEET 5.
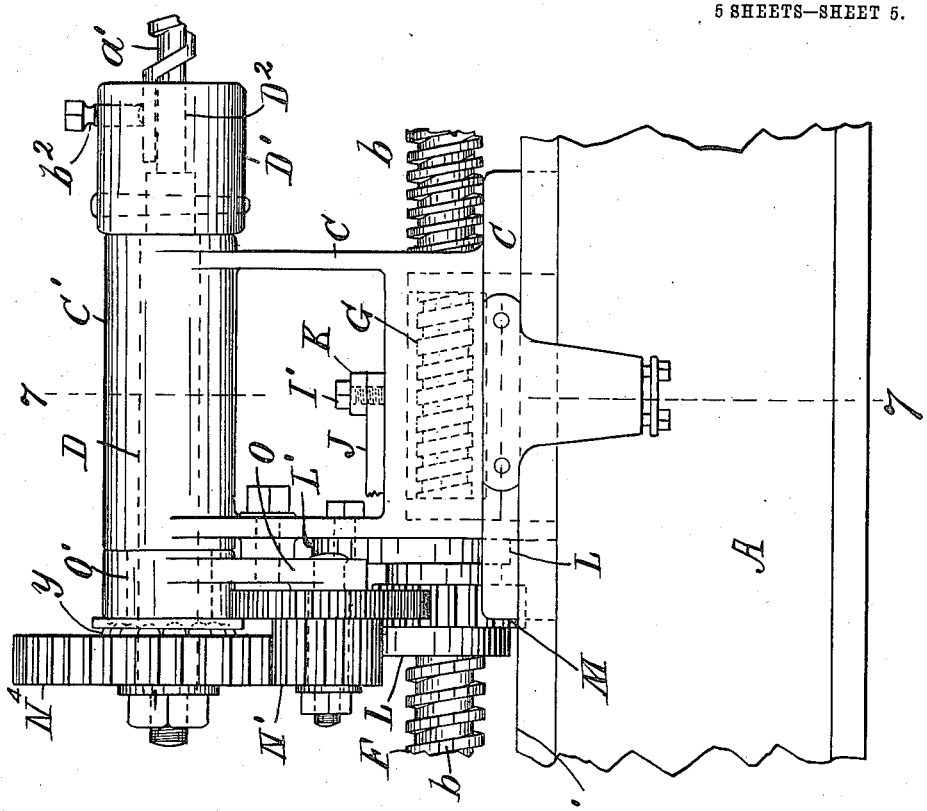
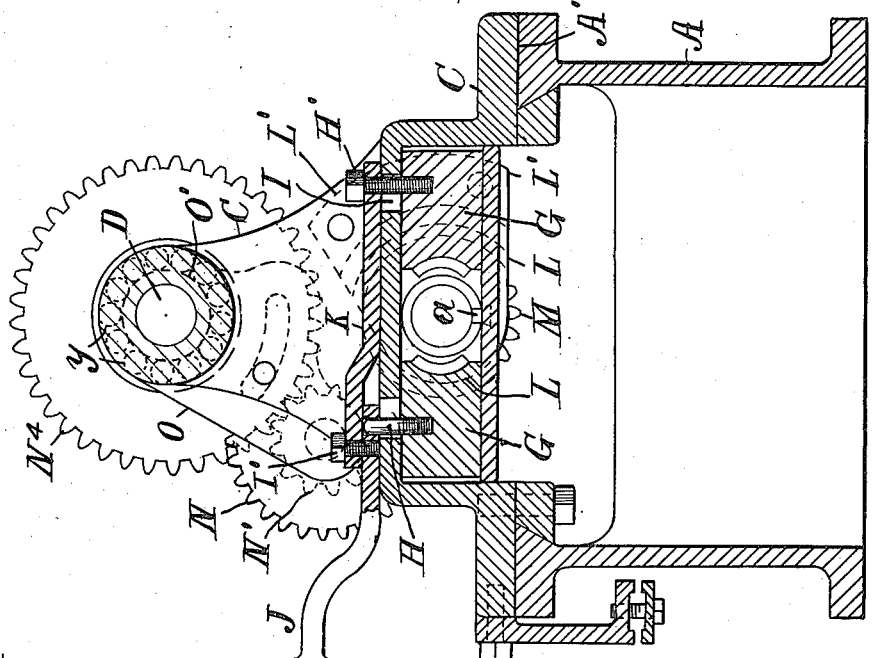
Witnesses:
L. Lee.
J. Walter Greenbaum.
Inventor
Charles S. Lockwood, per
Thomas S. Crane, Atty.

UNITED STATES PATENT OFFICE.

CHARLES S. LOCKWOOD, OF NEWARK, NEW JERSEY, ASSIGNOR TO HYATT ROLLER BEARING COMPANY, OF HARRISON, NEW JERSEY, A CORPORATION OF NEW JERSEY.

HELICAL-ROLL WINDER.

964,288.  Specification of Letters Patent.  Patented July 12, 1910.

Application filed January 7, 1910. Serial No. 536,802.

*To all whom it may concern:*

Be it known that I, CHARLES S. LOCKWOOD, a citizen of the United States, residing at 289 Market street, Newark, county of Essex, and State of New Jersey, have invented certain new and useful Improvements in Helical-Roll Winders, fully described and represented in the following specification and the accompanying drawings, forming a part of the same.

This invention relates to a machine for winding helical rolls, such as have long been used in anti-friction bearings to support a rotating shaft therein. In such machines it has been common heretofore to employ a long mandrel and wind a long series of coils thereon from a continuous strip, such series of coils being afterward cut into sections of suitable length to use as anti-friction rolls. The means for winding the strip upon the mandrel has commonly been fixed at one end of the bed and a carrier having the mandrel attached to one end of the same mounted movably upon the bed to advance the mandrel lengthwise of the bed during the winding operation, and a feed-screw extended from the opposite end of the carrier; by which construction either the mandrel or the feed-screw projects from the end of the bed and thus necessitates a floor-space nearly three times the length of the bed, for operating the machine. In such construction, the screw has been used to rotate the mandrel, and a nut having a differential movement in relation to the screw is therefore necessary to vary the advance of the mandrel when strips of various widths are wound upon it; and one object of the present invention is to dispense with such a differentially operated nut, and another object is to avoid any projection of the screw beyond the end of the bed, so as to shorten the floor-space required in operating the machine. These objects are attained by mounting the coil-winding devices in stanchions at one end of the bed, journaling a feed-screw on the bed, with a driving pulley at the opposite end of the bed, and mounting the mandrel-driver upon a carriage which is traversed longitudinally upon the bed by the feed-screw, and which is also rotated by the screw through the means of changeable gear-wheels; which construction permits the mandrel-driver to rotate at a different speed from the screw, although propelled thereby.

The invention also includes various details of construction, which will be understood by reference to the annexed drawing, in which Figure 1 is a plan of machine embodying the improvements; Fig. 2 is a side elevation of the same; Fig. 3 is a side elevation of the coil-winding devices upon a larger scale than Fig. 1; Fig. 4 is an end elevation, and Fig. 5 a plan of the same devices, Fig. 4 showing chiefly the parts relating to the winding and guiding of the strip; Fig. 6 is a side elevation of the mandrel-driver carriage, and Fig. 7 is a cross section of the same on line 7—7 in Fig. 6.

A is the bed provided on top with ways A', to which the carriage C is fitted movably to propel the mandrel, and provided with a bearing C' for a mandrel-driver spindle D.

Stanchions B support the winding devices at one end of the bed and one end of a feed-screw F is journaled in a bearing E' shown. A bearing E at the opposite end sustains the driving end of the screw, which is shown provided with speed-pulley G'.

The carriage C is provided with a sectional nut to engage said screw, consisting of two blocks G fitted within a box at opposite sides of the screw F, and having bolts H, H', projected from them through slots I in the top of the box.

A hand-lever J is pivoted to the bolt H and has an adjacent bolt I' which is connected with the bolt H' by a link K, the turning of the handle in the position shown in Fig. 5 operating to separate the nut-sections G, and the reverse position for the handle shown in Fig. 1 serving to draw the sections together and lock the carriage to the feed-screw.

A forked bearing L has a foot L' secured at one end of the carriage, and a toothed wheel M is carried movably by the same upon the feed-screw, being adapted to slip lengthwise upon the feed-screw, but having a feather $a$ fitted to a spline or groove $b$ upon the screw; so that the gear revolves with the feed-screw in all positions of the carriage. From this gear M motion is transmitted to the mandrel-driver D by a wheel N⁴ upon the spindle D', and change-wheels N, N' mounted upon an arm O which is adjustable upon a boss O' surrounding the rear end of the mandrel-driver, so that the wheel N can be removed and another of different size substituted when desired, to vary the rotations of the mandrel-driver in relation to the screw.

The spindle D carries a chuck D' having a bore D² to fit the mandrel a', and having a sloping slot b' to receive the head or primary end of the strip t, and a set-screw b² for clamping the same in the slot.

The coil-bending devices as shown in Figs. 3, 4 and 5, consist of winding-rollers c journaled on axles c' upon the front ends of the levers d, which are pivoted by pins e in the housing B, the rear ends of the lever being connected by a right and left-hand screw f fitted to nuts g on the levers, by which the rollers c may be approximated or separated at pleasure, to press upon the roll-coils e' of different sizes.

The screw f is journaled in a bearing h fixed upon the housing in line with the nuts g, and has split collars i threaded to fit the screw at opposite sides of the bearing, and each clamped thereon when adjusted by a clamping screw j as shown in Fig. 5.

A stand P upon the front of the housing is formed with a dovetailed groove Q to receive a so-called "roll-rest-slide" S, from which a front rest s is projected to contact with the front sides of the coils as they are wound upon the mandrel, as shown in Fig. 4, to resist the pull of the strip t'.

The roll-rest-slide and the rest are adjusted to the coils e' by a nut S' upon a screw T' which is attached to the stand P.

In Fig. 5, the strip t is shown extended between the rollers c and guided by two strip-guides in the form of wheels u and u', the former being pivoted upon a detachable foot w which is dovetailed loosely into cheeks w' upon the top of the front roll-rest s, which lies beneath the strip and its guide-wheels, so as to contact with the front side of the coils e'. The roll-rest s is detachable from the rest-slide S, so that it can be renewed when worn, and it carries upon its top the cheeks w' in which the foot w of the guide-roll u is fitted, thus enabling this guide-roll to be quickly removed whenever a new strip is applied to the mandrel. The guide-wheel u' is pivoted upon an adjustable holder U which extends over the top of the stand from a leg U', which extends downward at one side of the stand and is supported upon a guide-post V and an adjusting-screw V'. The post V is secured in the side of the stand and has a crosshead W upon its outer end in which the screw is journaled. The leg U' is movable upon the post V and when the screw is turned by the hand-wheel shown in Figs. 3 and 5, the guide-wheel u' can be adjusted to and from the guide-wheel u so as to embrace, and guide, strips of various widths when fed to the mandrel.

When a long mandrel is fed between the bending-rollers c to the middle of its length, the mandrel has a great tendency to vibrate; and to steady it, with the coils formed thereon, adjacent to the rolls, a vertically movable brace R is fitted to a groove R' in the stanchion and formed with an acute angled notch in the top which can be pressed upwardly to fit the coils, whatever their diameter, by an adjustable hand-lever R², which projects from the front of the bed as shown in Fig. 4, and can be secured in any adjusted position by locking it to a segment r by the bolt r'. This brace steadies the mandrel close to the rollers c which are formed with a slight taper at one end for a sufficient distance to produce a gradually increasing pressure upon the roll-coils as they move toward the rollers. The taper on the rollers is necessarily exaggerated in the drawing. It is found that such gradually increasing pressure renders the rollers more effective in conforming the rolls to the mandrel and in producing a smooth and uniform surface upon them.

The movement of the coils between the winding rollers is of two entirely distinct natures, the first consisting of the winding and bending movement of the strip, as it conforms to the shape of the mandrel; and the other a movement longitudinally of the coils and mandrel, as the mandrel is moved endwise to receive the accumulating coils during the winding operation. The first, or winding movement, is effected without any slipping or rubbing friction, as the rolls and coils rotate at the same surface speed, but the longitudinal movement, which is made under heavy pressure from the rolls, involves a great deal of friction; as it is transverse to the rotation of the rolls. This friction tends to move the rolls endwise very strongly, and is supported most effectively by a thrust-bearing at the end of the rolls next the chuck D'. Such thrust-bearings are formed by fitting annular ball-races x around the axles c' of the rollers, between that end of the roller and the adjacent lever, with balls x' fitted between the ball-races which resist the pressure with a minimum of friction. (See Fig. 3.) An equivalent strain in the opposite direction is exerted upon the mandrel-driver D, which is resisted by balls y fitted to ball-races between the bearing C' and the gear-wheel N, as shown in Fig. 6.

The tapering of the roller reduces its bearing surface on the coils, and thus concentrates its pressure upon the strip. The tapering of the roll also compresses the strip gradually and avoids the formation of a crease upon the strip which would be caused by a corner upon the roller where the strip first strikes it.

From the above description it will be seen that the winding of the coils upon the mandrel is effected without using a longitudinally movable screw, and no projection beyond the end of the bed is therefore occasioned in the use of the machine, except the projection of the mandrel which extends from the stanchions B at the beginning of the winding operation. By using the screw as the member to revolve the mandrel-driver, the construction is very greatly simplified, and a mere speed-cone is required to rotate the screw at various speeds when winding strips of different dimensions upon mandrels of different sizes.

It is obvious that a small or thin strip can be bent to wind upon a mandrel with less resistance and consequently at higher speed than a heavier strip, for which reason a speed-cone is provided.

A great convenience in introducing the strip to the mandrel is secured by having one of the guide-wheels $u$ readily removed, as is effected by means of the tapering dovetailed foot $w$ shown in Fig. 5. A hole is shown in the nearer end of this foot, in which a hooked tool can be inserted to pull it out of its cheeks $w'$ when the strip is wholly wound upon the mandrel, and the strip is then readily cut off by a suitable tool and the coils removed from the machine. When the mandrel is re-inserted and the strip secured in the chuck to wind a new roll, the mandrel is permitted to make a few turns, and the strip is then placed against the guide-wheel $u'$ and the foot $w$ carrying the guide-wheel $u$ is then inserted in its place and serves to direct the strip upon the mandrel in the desired manner.

The guide-wheel $u'$, when set to suit the width of a strip, need not be disturbed while the rolls are wound from a strip of that width, as the removability of the wheel $u$ permits the free handling of the strip.

Having thus set forth the nature of the invention what is claimed herein is:

1. In a helical roll-winder, the combination, with a mandrel and means to advance it, of rollers to compress the roll-coils upon the mandrel, said rollers having their axes parallel with the mandrel, and having a slightly greater diameter at one end, to exert an increasing pressure upon the roll-coils as they move between the rollers.

2. In a helical roll-winder, the combination, with a mandrel and means to advance it, of rollers to compress the roll-coils upon the mandrel, the said rollers having their axes parallel with the mandrel, and having slightly greater diameter at one end, to exert an increasing pressure upon the roll-coils as they move between the rollers, and balls fitted between the delivery end of each roller and its bearing to resist the end pressure of the advancing coils.

3. In a helical roll-winder, the combination, with a mandrel and rollers to bend the strip around the same, of a stand in front of the mandrel, a rest-slide fitted to the top of the stand, a guide-wheel on the rest-slide, a guide-holder adjacent to such slide, a guide-wheel thereon, means for adjusting the holder upon the stand, and means for adjusting the guide-wheels to and from one another toward the edges of the strip.

4. In a helical roll-winder, the combination, with a mandrel and means to advance it, of rollers to compress the roll-coils upon the mandrel, movable strip-guides as the wheels $u$ and $u'$, adjustable to both edges of the strip to guide the strip positively to the mandrel, and a front roll-rest adjustable to the front side of the roll beneath the level of the strip-guides.

5. In a helical roll-winder, the combination, with a mandrel, and rollers to press the strip upon the same, of a stand in front of the mandrel, a rest-slide fitted to the top of the stand, and a holder carrying a strip-guide adjacent to such slide with a leg extended downward at the side of the stand, and a guide-post in the side of the stand for the said leg, a crosshead upon such guide-post and a screw fitted movably to the stand, the crosshead and the leg of the holder to adjust the holder and the strip-guides before the mandrel.

6. In a helical roll-winder, the combination, with a suitable bed, of a housing fixed thereto, a winding device thereon for winding the coils upon a mandrel, a carriage movable lengthwise of the bed, a mandrel-driver journaled upon the carriage, a mandrel supported thereby and extended through the bending device, a screw-bearing fixed upon the bed, a feed-screw journaled in said bearing, a nut upon the carriage engaging the feed-screw, means for rotating the screw, and means connecting the screw and the mandrel-driver to rotate the mandrel-driver while the carriage is fed along the bed.

7. In a helical roll-winder, the combination, with a suitable bed, of a housing fixed upon one end of the bed, a winding device thereon for winding the coils upon a mandrel, a carriage movable lengthwise of the bed, a mandrel-driver journaled upon the carriage, a mandred supported thereby and extended through the said winding device, a screw-bearing fixed upon the bed, a feed-screw journaled in said bearing and extended through a nut upon the carriage, a gear-wheel journaled upon the carriage and splined to the feed-screw to be rotated thereby, and a connection from said wheel to the mandrel-driver to rotate the same while the carriage advances.

In testimony whereof I have hereunto set my hand in the presence of two subscribing witnesses.

CHARLES S. LOCKWOOD.

Witnesses:
L. LEE,
THOMAS S. CRANE.